(No Model.)
T. J. MAYALL.
PNEUMATIC DISPATCH TUBE.
No. 243,784.  Patented July 5, 1881.
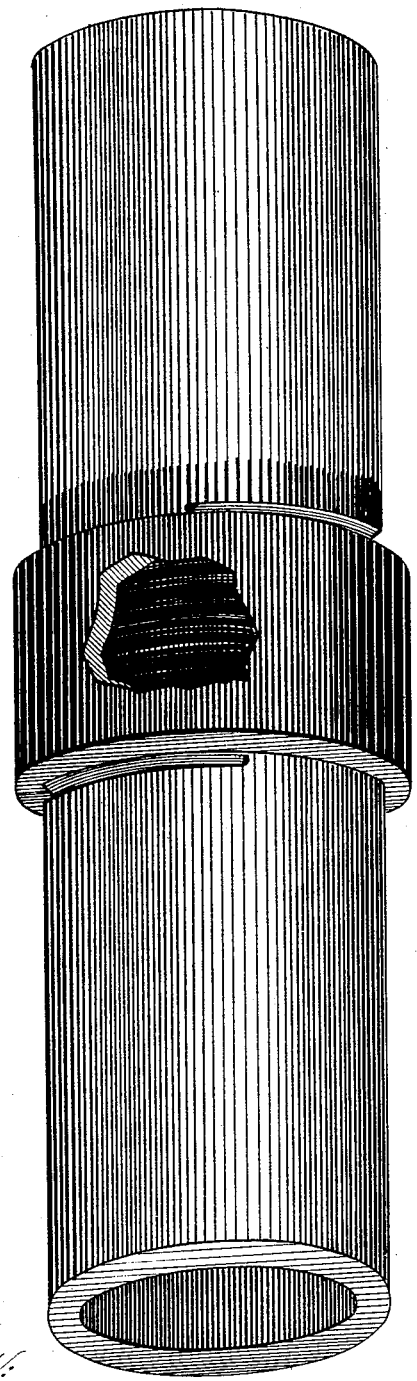
Witnesses:
Inventor:

UNITED STATES PATENT OFFICE.

THOMAS J. MAYALL, OF READING, MASSACHUSETTS.

PNEUMATIC DISPATCH-TUBE.

SPECIFICATION forming part of Letters Patent No. 243,784, dated July 5, 1881.

Application filed March 24, 1881. (No model.)

*To all whom it may concern:*

Be it known that I, THOMAS J. MAYALL, of Reading, in the county of Middlesex and Commonwealth of Massachusetts, have invented a new and useful Improvement in Pneumatic Dispatch-Tubes, of which the following is a specification.

The object of my invention is to produce a pneumatic dispatch-tube in which the dispatch-carrying box may move without appreciable friction; and it consists in making such tube of a compound of rubber and graphite, with a portion of sulphur to aid in vulcanizing.

The proportions of the compound are to one pound of rubber about two and one half pounds of graphite and about eight ounces of sulphur. This compound, when thoroughly mixed, is run into sheets, which are cut into strips of equal width. These strips are wound on a former (an elongated cylinder) of wood or metal, of about the diameter desired for the tube, and of convenient length—say from four to twelve feet. Before winding the rubber and graphite compound on the former it must be covered with a thin coating of pulverized talc or other similar substance to prevent the rubber from adhering to its surface. The rubber and graphite compound is then to be vulcanized, so as to become a hard metallic-like substance. The inside of the tube is then bored out perfectly smooth and a screw-thread cut on the outside of both ends. A coupling-piece about four to eight inches long, according to the size of the diameter of the tube, is prepared with a screw-thread cut on the inside of it to correspond with and receive the screw-threads cut on the outside of the end of the tubes, and by this coupling a sufficient number of tubes are joined end to end to make the desired length of tube-line.

Curved pieces, for diverging at any angle from a straight line, may be made by forming and vulcanizing the rubber and graphite compound in suitable molds, in longitudinal sections, with flanges, to be put together after it is vulcanized and finished smoothly on the inside.

The graphite and rubber compound vulcanized will not corrode, nor is it in any way affected by exposure to heat and cold of the atmosphere, and therefore, unless subjected to violence, is practically indestructible. It may be buried in the earth or sunk in water, fresh or salt, and receive no detriment.

In the drawing annexed the figure shows a short piece of the pneumatic dispatch-tube and a joint and coupling in the same.

I claim as new and my invention—

A pneumatic dispatch-tube made of a vulcanized compound of rubber and graphite, substantially as described.

THOS. J. MAYALL.

Witnesses:
CHS. HOUGHTON,
F. L. HOUGHTON.